United States Patent
Thomson et al.

(10) Patent No.: US 8,273,174 B2
(45) Date of Patent: Sep. 25, 2012

(54) METHOD OF MAKING A FIBER CEMENT BOARD WITH IMPROVED PROPERTIES AND THE PRODUCT

(75) Inventors: Sherry L Thomson, Normandy Park, WA (US); David J O'Callaghan, Bonney Lake, WA (US); John A Westland, Auburn, WA (US); Bing Su, Federal Way, WA (US)

(73) Assignee: Wyerhaeuser NR Company, Federal Way, WA (US)

( * ) Notice: Subject to any disclaimer, the term of this patent is extended or adjusted under 35 U.S.C. 154(b) by 326 days.

(21) Appl. No.: 12/347,501

(22) Filed: Dec. 31, 2008

(65) Prior Publication Data

US 2010/0162926 A1  Jul. 1, 2010

(51) Int. Cl.
| | |
|---|---|
| C04B 2/00 | (2006.01) |
| C04B 7/14 | (2006.01) |
| C04B 14/00 | (2006.01) |
| C04B 28/10 | (2006.01) |
| C04B 28/14 | (2006.01) |
| C04B 5/00 | (2006.01) |
| C04B 28/08 | (2006.01) |
| C04B 9/00 | (2006.01) |
| C04B 11/00 | (2006.01) |
| C04B 16/00 | (2006.01) |
| C04B 24/00 | (2006.01) |
| C04B 7/00 | (2006.01) |
| C04B 16/02 | (2006.01) |
| C04B 18/06 | (2006.01) |
| C04B 12/00 | (2006.01) |
| C04B 24/14 | (2006.01) |
| C04B 24/10 | (2006.01) |

(52) U.S. Cl. ........ 106/805; 106/618; 106/619; 106/686; 106/705; 106/772; 106/778; 106/780; 106/790; 106/797

(58) Field of Classification Search ............ 106/805, 106/797, 790, 780, 619, 618, 778, 772, 705, 106/686; 977/775
See application file for complete search history.

(56) References Cited

U.S. PATENT DOCUMENTS

| | | | | |
|---|---|---|---|---|
| 2005/0284339 A1* | 12/2005 | Brunton et al. | ......... | 106/713 |
| 2007/0246857 A1* | 10/2007 | Kurtis et al. | ......... | 264/236 |
| 2010/0285295 A1* | 11/2010 | Wang et al. | ......... | 428/292.4 |

OTHER PUBLICATIONS

Shi, Caijun; Mo, Y.L.."High Performance Construction Materials: Science and Application". 2008 [Retrieved on Mar. 9, 2011]. Retrieved from [http://books.google.com/books?id=pWkxjs1v AqMC&printsec=frontcover&dq=High-performance+ construction+materials:+science+and+application&hl=en&ei= aPR3TfSWFIWCIAeB2dDNBw&sa=X&oi=book_result&ct= result&resnum=1&ved=0C.*

Simonsen, John. "Bio-based Nanocomposites: Challenges and Opportunities". Dec. 30, 2004 [Retrieved Sep. 1, 2011]. Retrieved from [http://www.swst.org/meetings/AM05/simonsen.pdf].*

Hentze, Hans-Peter, "From Nanocellulose Science Towards Applications". VTT-Technical Research Center of Finland. Jun. 2, 2010 [Retrieved on Jul. 31, 2012]. Retrieved from http://www.vtt.fi/files/events/PulPaper10/NFCApplications_HPH.pdf.*

Peng, B.L., et al.; "Chemistry and Applications of Nanocyrustalline Cellulose and its Derivitavives: A Nanotechnology Perspective", The Canadian Journal of Chemical Engineering, vol. 9999, Wiley Online Library, 2011.

Stephenson, J. Newell; "Preparation & Treatment of Wood Pulp", Pulp and Paper Manufacture, vol. 1, McGraw-Hill Book Company, Inc., 1950.

Casey, James P.; Pulp and Paper Chemistry and Chemical Technology, Second Edition Revised and Enlnterscience Publishers, I nc., New York, larged, vol. 1: Pulping and Bleaching, 1952.

* cited by examiner

Primary Examiner — Anthony J Green
Assistant Examiner — Karam Hijji
(74) Attorney, Agent, or Firm — John M. Crawford

(57) ABSTRACT

A cement product incorporating nanocrystalline cellulose and cellulose fiber throughout the product and a method of making the product.

13 Claims, No Drawings

METHOD OF MAKING A FIBER CEMENT BOARD WITH IMPROVED PROPERTIES AND THE PRODUCT

FIELD

This application relates to a method for improving the modulus of elasticity of cement boards by the addition of nanocrystalline cellulose (NCC) to the cement board formulation. A cement fiber board is also disclosed.

DETAILED DESCRIPTION OF THE INVENTION

The internal structures of houses and other buildings are commonly protected from environmental elements by exterior siding materials. These siding materials are typically planks or panels composed of wood, concrete, brick, aluminum, stucco, wood composites, or fiber-cement composites. Some common fiber-cement composites are fiber-cement siding, roofing, backerboard, underlayment and trim which are generally composed of cement, silica sand, unbleached wood pulp, and various additives. Fiber-cement products offer several advantages over other types of materials, such as wood siding, because it is weatherproof, relatively inexpensive to manufacture, fire-resistant, and invulnerable to rotting or insect damage.

Most commercial fiber-reinforced cement siding products are made using the Hatscheck process. The Hatscheck process was initially developed for the production of asbestos composites, but it is now used for the manufacture of non-asbestos, cellulose fiber reinforced cement composites. In this process, unbleached cellulose fibers are re-pulped in water; the re-pulped fibers are refined and then mixed with cement, silica sand, and other additives to form a mixture. The fiber-cement mixture is deposited on a felt band substrate, vacuum dewatered, and cured to form a fiber reinforced cement matrix in sheet form.

A number of factors can affect the cement -board strength including but not limited to the presence of sugars or other organic materials which can affect curing. These materials retard the hydration reaction of cement and thereby retard the setting or hardening of a mortar or concrete. Cement is purposely retarded in ready-mix concrete during long hours of transportation, for mitigation of stress due to temperature (heat) when used in large-sized concrete structures, and for decorated washing finishes.

When these organic materials are measured, the manufacturers of fiber-cement siding have observed an inverse relationship between the amount of these materials in an unbleached pulp and the strength properties of the final product. Cellulose is added to aid in the filterability of the slurry on the forming wire to help retain cement and silica particles. However, the use Of cellulose fiber in cement materials can tower the resistance to water induced damage and can result in higher water permeability and higher wicking. Channels and voids in the cellulose fiber lumens and cell walls can become filled with water when exposed to rain or condensation for extended periods of time and can adversely affect durability. The presence of cellulose fibers can cause the board to have a high saturated mass, poor wet to dry dimensional stability, lower saturated strength and decreased resistance to water damage which is more critical in products such as fiber cement roofing. Since the products containing cellulose fibers are easier to be saturated with water, the products are more susceptible to damage from freezing and thawing. The present application fulfills some of these shortcomings.

The present invention has nanocrystalline cellulose and cellulose fibers dispersed throughout a cementitious matrix to provide a cement product that has a better modulus of elasticity without sacrificing the MOR or ETB to any substantial extent. In one embodiment the modulus of elasticity can be increased 10% as compared to a cement product that does not contain nanocrystalline cellulose. In another embodiment the modulus of elasticity can be increased 15% as compared to a cement product that does not contain nanocrystalline cellulose.

In an embodiment of the cement product having cellulose fibers and nanocrystalline cellulose dispersed throughout the matrix and resulting product the saturated moisture absorption is reduced 1 percent as compared with a cement product that does not have nanocrystalline cellulose. In another embodiment of the cement product having cellulose fibers and nanocrystalline cellulose dispersed throughout the matrix and resulting product the saturated moisture absorption is reduced 2 percent as compared with a cement product that does not have nanocrystalline cellulose. For reference a cement product that does not have nanocrystalline cellulose has 38.5% water saturation value.

The time it takes moisture to reach 1 mm of vertical wicking is longer in a cement product having cellulose fibers and nanocrystalline cellulose dispersed throughout the matrix and the resulting product than in a composite building material that does not contain nanocrystalline cellulose. In one embodiment it takes twice as long for the moisture to reach 1 mm. In another embodiment it takes three times as long for the moisture to reach 1 mm. In another embodiment it takes five times as long to reach 1 mm. In another embodiment it takes fifteen times as long.

The nanocrystalline cellulose has a width from 0.05 to 5 μm and a length of 2.5 to 60 μm.

A Fiber Cement formulation typically is comprised of refined cellulosic fibers, cement and ground silica in the following proportions by dry weight of total mix; Cement 30-40%; Silica 50-60%; Fiber 5-10% and additives 1-4%. Other formulations can include inert fillers such as limestone or calcium carbonate.

In one embodiment, nanocrystalline cellulose can be added to the cement formulation from a suspension of the additive in water. The consistency of the suspension is from 0.1% to 8%. In another embodiment nanocrystalline cellulose can be added to the cement formulation at a suspension consistency of from 2% to 6%. In yet another embodiment the nanocrystalline cellulose can be added to the cement formulation at a suspension consistency of from 4% to 5%.

In this application a suspension consistency of 5.6-5.8% was used.

In one embodiment the additive, nanocrystalline cellulose, is added to the cement formulation at levels from 0.05 percent to 3 percent by dry weight nanocrystalline cellulose of the total dry solids in the cement formulation and mixed. In another embodiment the nanocrystalline cellulose is added to the cement formulation at levels from 0.75 percent to 2.5 percent by weight nanocrystalline cellulose of the total dry solids in the cement formulation and mixed. In yet another embodiment the nanocrystalline cellulose is added to the cement formulation at levels from 1 percent to 2 percent by weight nanocrystalline cellulose of the total dry solids in the cement formulation and mixed.

Nanocrystalline cellulose can be obtained from Cellulose Research Institute, SUNY-ESF, 307 Stadium Place Syracuse N.Y. The nanocrystalline cellulose used in the experiments had the properties shown in Table 1.

TABLE 1

NCC Properties (As Measured)

|         | Length, μm | Width, μm |
|---------|------------|-----------|
| Mean    | 12.65      | 0.418     |
| Median  | 10.33      | 0.231     |
| Minimum | 2.86       | 0.089     |
| Maximum | 56.53      | 3.949     |
| Count   | 400        | 136       |

The width of the NCC material was too small to resolve clearly using an optical microscope. These measurements were made on the digital SEM photos of the crystals using the calibrated scale bar in the image as the calibration standard for the image analysis software. The count is the number of fibers used to determine the properties These measurements indicate the nanocrystalline cellulose has a width from 0.05 to 5 μm and a length of 2.5 to 60 μm.

As used in this application, consistency refers to the percent solid content of a liquid and solid mixture. For example a 5% consistency of NCC means there are 5 grams of NCC in one hundred grams of NCC and liquid.

A Fiber Cement formulation typically is comprised of refined cellulosic fibers, cement and ground silica in the following proportions by dry weight of total mix; Cement 30-40%; Silica 50-60%; Fiber 5-10% and additives 1-4%. Other formulations can include inert fillers such as limestone or calcium carbonate.

In one embodiment, nanocrystalline cellulose can be added to the cement formulation from a suspension of the additive in water. The consistency of the suspension is from 0.1% to 8%. In another embodiment nanocrystalline cellulose can be added to the cement formulation at a suspension consistency of from 2% to 6%. In yet another embodiment the nanocrystalline cellulose can be added to the cement formulation at a suspension consistency of from 4% to 5%.

In this application a suspension consistency of 5.6-5.8% was used.

In one embodiment the additive, nanocrystalline cellulose, is added to the cement formulation at levels from 0.05 percent to 3 percent by dry weight nanocrystalline cellulose of the total dry solids in the cement formulation and mixed. In another embodiment the nanocrystalline cellulose is added to the cement formulation at levels from 0.75 percent to 2.5 percent by weight nanocrystalline cellulose of the total dry solids in the cement formulation and mixed. In yet another embodiment the nanocrystalline cellulose is added to the cement formulation at levels from 1 percent to 2 percent by weight nanocrystalline cellulose of the total dry solids in the cement formulation and mixed The additive can be added in the presence of a surfactant or without a surfactant. Suitable surfactants or debonding agents include anionic, nonionic, cationic and amphoteric surfactants. The term surfactant includes, but is not limited to oil in water emulsions. Any suitable debonding agents may be used. Examples of anionic surfactants include sodium stearate, sodium oleate, sodium dodecyl sulfate, sodium dodecyl benzene sulfonate, polyether sulfate, phosphate, polyether ester and sulfosuccinate. Examples of cationic surfactants include dodecylamine hydrochloride, hexadecyltrimethyl ammonium bromide, cetyltrimethyl-ammonium bromide, and cetylpyridinium bromide.

One class of surfactant is cationic surfactants based on quaternary ammonium compounds containing fatty type groups. Examples of non-ionic surfactants include polyethylene oxides, sorbitan esters, polyoxyethylene sorbitan esters, and alkylaryl polyether alcohols. An example of ampholytic or zwitterionic surfactant is dodecyl betaine. Examples of commercial surfactant are EKA Chemicals Inc. Berolcell 587K which is a cationic surface active agent and Process Chemicals, LLC Softener CWW which is a cationic surfactant. Anther debonding agents is Berocell 584 from Berol Chemicals, Incorporated of Metairie, La. in a 0.25% weight of debonder to weight of fiber.

The surfactants may also be classified into the following groups: quaternary compounds, tertiary, secondary and primary amine salts.

Nonlimiting examples of quaternary compounds are mono cottonseed oil trimethyl ammonium chloride, mono coco trimethyl ammonium chloride, mono stearyl trimethyl ammonium chloride, mono oleyl trimethyl ammonium chloride, mono soya trimethyl ammonium chloride, dilaryl dimethyl ammonium chloride, di hydrogenated dimethyl ammonium chloride derived from tallow oil, dimethyl ammnonium chloride derived from soya oil, N-alkyl ($C_{12,\ 14,\ 16}$) dimethyl benzyl ammonium chloride and coco dimethyl benzyl ammonium chloride.

A nonlimiting example of a tertiary amine salt is mono stearyl dimethyl amine chloride.

Nonlimiting examples of secondary amine salts are di coco amine chloride, di hydrogenated tallow amine chloride and di oleyl amine chloride.

Nonlimiting examples of primary amine salts are dodecylamine chloride, palmitylamine chloride, coco amine chloride, coco amine acetate, stearyl amine chloride, stearyl amine acetate, oleyl amine chloride, oleyl amine acetate, soy amine chloride and tallow amine chloride.

The amount of surfactant may be from 0.1 to 1% by weight based on the weight of the dry pulp.

The surfactants can also be cationic quaternary ammonium compounds with aliphatic substituents on the nitrogen atom that, in essence, coat the fibers with a hydrocarbon film and interfere with the natural hydrogen bonding tendency of cellulose fibers.

The surfactant can be added to disperse the nanocrystalline cellulose in the slurry before it is added to the cement formulation. It is envisioned that without the surfactant present agglomeration of the nanocrystalline cellulose occurs and may contribute to less than optimum board properties. The surfactant may also decrease the bonding of the fibers to the cement matrix. This would decrease the number of fibers which break when a load is applied and increase the number of fibers that would pull out of the matrix thereby improving the overall toughness of the fiber cement product. Articles can be formed from the cement formulation after dewatering on a screen support and curing in much the same way as described in the test method for forming the board.

Increasing levels of NCC resulted in a positive directional increase in board density while the thickness decreased. At the 2% addition of NCC, the modulus of elasticity increased approximately 16%. The modulus of rupture remained about the same. Elongation to break was negatively impacted. Increasing levels of NCC in the cement slurry resulted in a significant increase in filtration time. As the addition of NCC goes from 0.5% to 1% to 2% the filtration time increases from 1.5 to 2 to 3 times the filtration time when there is no addition. This suggests that the NCC which has a high surface area forms strong bonds with the formulation components bonding the structure and resulting in a higher retention of the components. Alternatively the NCC is believed to fill the voids in the structure thereby increasing the density and resulting in an increase in filterability. A further result of increased levels of NCC had the effect of improving the wicking time by increasing the time it takes water to penetrate the board through capillary action. This increase in time was between five and fifteen times that of the board which did not contain nanocrystalline cellulose. At higher levels of NCC, the wicking distance did not increase above a particular height even after extended contact of the bottom most tip of a fiber cementitious board strip in contact with water.

Cementitious board was made by the method described as follows.
1. Nanocrystalline Cellulose was provided from Cellulose Research Institute, SUNY-ESF, 307 Stadium Place, Syracuse, N.Y. The NCC was prepared from Weyerhaeuser M919 Pulp from the Cosmopolis, WA Pulp Mill, The NCC was dispersed in water at about 5.6-5.8% consistency.
2. Portland cement. ASTM Type I/II
3. Tasman Kraft pulps refined to 450 CSF.
4. Ground silica: SIL-CO-SIL®90, Sil-CO-Sil®52, U.S. Silica Company
5. Tap water: 4 L/each board Equipment
1. In-house built mold, top casting box, 8"×8"×6", bottom collecting box lined with vacuum and drainage valve, a vacuum gauge, 8"×8"×12" see attached photo.
2. Heavy duty laboratory blender (Waring), 4 L
3. Motorized hydraulic press (PHI)
4. Vacuum: up to 25 in Hg
5. Balances
6. Screens: Top screen in contact with the cement mixture, 100 mesh. Double layered screens, 4 mesh and 20 mesh.
7. Plates: stainless steel 12 in.×12 in.
8. Beakers, 4 L, 1 L
9. Mixers Procedure
1. Prepare the dilute slurry (4-5% solids)
    1.1 Determine the moisture content of Tasman pulp samples and calculate the required amount of pulp as needed in the formulation (8% of total solids by weight).
    1.2 Weigh out the pulp and blend with tap water (about 0.5% consistency) using the HD blender at low speed for 1 minute.
    1.3 Measure out desired amount of NCC and disperse in 500 ml tap water for 30 s with the mixer.
    1.4 Weigh out the desired amount of cement powder (37% of total solids by weight) and silica (55% of total solids by weight, 3:1 ratio of Sil-90 to Sil-52) in a fume hood. Mix with 500 ml tap water in a beaker at about 30-40% consistency to form a smooth paste. Mix NCC with the cement slurry for 1 minute.
    1.5 Add the paste to the HD blender and mix at medium speed for 3 minutes.
2. Wet Board Formation
    2.1 Assemble the screens (100 mesh, 20/4 mesh double layer screen and a large hole support screen) and clip on the top casting box of the mold. Close the valves of drainage and vacuum. Open the building vacuum to about 20 in Hg.
    2.2 Transfer the slurry from the blender to the sheet mold. Open the valve connecting building vacuum to the mold and apply vacuum at 20 in Hg for 2 minutes.
    2.3 Shut off the vacuum and release the vacuum. Transfer the board from the filter screen to the press. The top and bottom of the board should contact a #20/ and #4 mesh screen respectively backed by blotter paper. Record the wet weight of the sheet.
3. Pressing
    3.1 Use a dummy block to adjust press for a desired pressure at 1500 psig. Set the timer at 3 minutes.
    3.2 Press the sheet for 3 minutes under 1500 psig.
    3.3 Take out the plates. Weight the board again and place in a labeled plastic bag with zip-lock seal.
4. Curing
    4.1 Pre-curing
        Store boards in sealed plastic bags and lay flat with alumina plate as weights for about 40 hours at room temperature.
    4.2 Autoclave-curing
        Cut the boards into testing strips (125 mm×40 mm) on the second day with a diamond saw and label each piece with experiment series—run number—strip number. On the early morning of the third day, load samples into the autoclave vessel and purge the vessel with steam. Heat up the digester with the building high pressure steam to 180° C. and 130 psi in 2 hours and hold for 8 hours before releasing the steam and pressure gradually over 1 hour.
        Take out the samples and scrape off the rough edges for testing.

Board Testing

A 3-point bending test was developed based on ASTM C1185. Modification was applied according to the sample dimension for proper span and speed. Each board was wet conditioned (soaked in water for 48 h) prior to testing. The dimensions and weight of each specimen was measured before the strength test for density. The 3 point bending test was performed on an Instron testing machine, using a 4 inch span and a 0.2 inch/min speed. The moisture content was determined after the pieces were broken. The following values were reported: weight, dimension, density, maximum displacement, and maximum load, MOE (Modulus of Elasticity), MOR (Flexural Strength), ETB (energy to break), and SWA (Saturated Water Absorption). The board properties were measured after autoclaving the boards.

Board properties are given in Table 2 and 3. Table 3 is an average of the values in Table 2.

TABLE 2

Cement Board Properties With NCC Addition

| Sample ID | % NCC* | MOE (kgf/mm$^2$) | MOR (kgf/mm$^2$) | ETB (kgf-mm) | Thickness (mm) | Density (kg/m$^3$) | Saturated Moisture % | Board weight wet g | Filtration time, sec. |
|---|---|---|---|---|---|---|---|---|---|
| 1 | 2 | 638 | 1.42 | 32.3 | 3.711 | 1647.8 | 35.1 | 236 | 118 |
| 2 | 0.5 | 623 | 1.59 | 32.6 | 3.807 | 1632.5 | 36.7 | 230 | 59 |
| 3 | 1 | 632 | 1.52 | 32.6 | 3.792 | 1633.4 | 35.3 | 233 | 84 |
| 4 | 2 | 642 | 1.54 | 29.4 | 3.822 | 1629.9 | 35.1 | 238 | 141 |
| 5 | 1 | 601 | 1.62 | 45.9 | 3.784 | 1616.4 | 36.4 | 232 | 81 |
| 6 | 0.5 | 612 | 1.52 | 38.7 | 3.861 | 1612.7 | 36.5 | 233 | 62 |
| 7 | 0 | 543 | 1.57 | 45.2 | 3.932 | 1588.1 | 37.1 | 234 | 40 |
| 8 | 0 | 578 | 1.55 | 37.2 | 3.893 | 1601.6 | 37.3 | 232 | 44 |
| 9 | 2 | 640 | 1.60 | 32.1 | 3.680 | 1642.3 | 36.9 | 228 | 112 |
| 10 | 2 | 616 | 1.44 | 40.8 | 3.777 | 1618.4 | 35.6 | 237 | 127 |
| 11 | 0 | 527 | 1.54 | 44.5 | 3.913 | 1576.9 | 36.2 | 228 | 39 |

TABLE 2-continued

Cement Board Properties With NCC Addition

| Sample ID | % NCC* | MOE (kgf/mm²) | MOR (kgf/mm²) | ETB (kgf-mm) | Thickness (mm) | Density (kg/m³) | Saturated Moisture % | Board weight wet g | Filtration time, sec. |
|---|---|---|---|---|---|---|---|---|---|
| 12 | 0.5 | 585 | 1.58 | 41.8 | 3.903 | 1640.5 | 37.0 | 236 | 63 |
| 13 | 0.5 | 572 | 1.50 | 34.1 | 3.810 | 1636.8 | 38.3 | 233 | 67 |
| 14 | 0 | 524 | 1.54 | 46.2 | 3.927 | 1596.3 | 38.1 | 231 | 43 |
| 15 | 1 | 551 | 1.49 | 37.8 | 3.845 | 1602.8 | 35.8 | 234 | 83 |
| 16 | 1 | 589 | 1.43 | 31.8 | 3.857 | 1626.9 | 36.4 | 236 | 88 |
| 17 | 1 | 579 | 1.52 | 42.0 | 3.905 | 1606.8 | 36.8 | 221 | 66 |
| 18 | 0 | 529 | 1.53 | 46.4 | 3.925 | 1627.3 | 39.6 | 232 | 37 |
| 19 | 1 | 529 | 1.49 | 47.4 | 3.932 | 1595.8 | 36.6 | 234 | 74 |
| 20 | 1 | 575 | 1.46 | 38.1 | 3.883 | 1594.9 | 37.5 | 231 | 76 |
| 21 | 2 | 556 | 1.55 | 48.9 | 3.888 | 1599.1 | 36.6 | 236 | 128 |
| 22 | 0.5 | 511 | 1.45 | 44.7 | 4.071 | 1556.3 | 37.2 | 236 | 54 |
| 23 | 0 | 520 | 1.51 | 45.8 | 3.978 | 1573.9 | 38.7 | 230 | 38 |
| 24 | 2 | 552 | 1.46 | 47.8 | 3.914 | 1605.2 | 37.3 | 237 | 118 |
| 25 | 0.5 | 543 | 1.52 | 44.1 | 3.927 | 1601.8 | 39.4 | 234 | 58 |
| 26 | 0.5 | 559 | 1.57 | 47.5 | 3.914 | 1579.2 | 38.3 | 233 | 56 |
| 27 | 0 | 461 | 1.49 | 47.2 | 3.955 | 1571.0 | 40.4 | 231 | 37 |
| 28 | 2 | 592 | 1.55 | 50.7 | 3.885 | 1617.0 | 38.2 | 239 | 113 |
| 29 | 0 | 477 | 1.45 | 46.1 | 3.987 | 1566.7 | 40.6 | 232 | 36 |
| 30 | 0.5 | 532 | 1.58 | 50.8 | 3.929 | 1582.4 | 38.5 | 235 | 59 |
| 31 | 2 | 582 | 1.46 | 47.7 | 3.919 | 1599.3 | 38.2 | 237 | 119 |
| 32 | 1 | 576 | 1.57 | 50.9 | 3.943 | 1594.3 | 37.6 | 237 | 75 |

*dry wt. % NCC on solids in cement formulation

TABLE 3

Board Properties

| % NCC* | MOE (kgf/mm²) | MOR (kgf/mm²) | ETB (kgf-mm) | Max displacement mm | Thickness mm | Density (kg/m³) | Saturated Moisture, % | Board weight wet g | Filtration time, s |
|---|---|---|---|---|---|---|---|---|---|
| 0.0 | 520 | 1.52 | 44.8 | 8. | 3.939 | 1588 | 38.5 | 231 | 39 |
| 0.5 | 567 | 1.54 | 41.8 | 8. | 3.903 | 1605 | 37.7 | 234 | 60 |
| 1.0 | 579 | 1.51 | 40.8 | 8. | 3.868 | 1609 | 36.6 | 232 | 78 |
| 2.0 | 602 | 1.50 | 41.2 | 8. | 3.825 | 1620 | 36.6 | 236 | 122 |

*dry wt. percent NCC on solids in cement formulation

Wicking Test—Experimental Procedure
1. Testing strips (125 mm×40 mm) are suspended vertically above a water bath with the bottom most tip of each board (5 mm) submerged in water
2. The wicking height is observed and recorded at premeasured intervals using a stopwatch and calibrated measuring gauge at the measurement levels (Table 4)
3. Test was carried out in a constant humidity room at 65% relative humidity
4. Water level maintained at constant level Equipment
1. Constant Humidity Chamber
2. Calibrated measuring gauge
3. Stopwatch
4. Retort stands for each sample
5. Water level feed control

TABLE 4

Wicking Properties

| Wicking Length, (cm) | Mix Formulation Wicking Time (min) | | | |
|---|---|---|---|---|
| | 0% NCC* | 0.5% NCC* | 1% NCC* | 2% NCC* |
| 0-1 | 0.75 | 4 | 5 | 11 |
| 1.5-1.8 | 30 | 30 | 30 | 210 |
| 2-2.2 | 90 | 90 | 210 | 270 |
| 2.2-2.3 | 210 | 210 | 270 | No Wicking |
| 2.5-2.6 | 1320 | 1320 | 1320 | No Wicking |

*dry wt. percent NCC on solids in cement formulation

It will be appreciated that changes can be made without departing from the spirit of the invention.

The invention claimed is:
1. A fiber cement board, comprising:
a cementitious matrix;
kraft cellulose pulp fibers dispersed throughout the cementitious matrix, and
nanocrystalline cellulose dispersed throughout the cementitious matrix.
2. The fiber cement board of claim 1 wherein the nanocrystalline cellulose is present in an amount of 0.05% to 3% by weight based on the weight of the total dry solids in the cementitious matrix.

3. The fiber cement board of claim 1 wherein the cellulose pulp fibers are present in the amount of 5 to 10 percent of the total dry solids in the cementitious matrix.

4. The fiber cement board of claim 1 wherein the cementitious material comprises 30 to 40 percent of the total dry solids in the cementitious matrix.

5. The fiber cement board of claim 1 wherein the nanocrystalline cellulose particles have a width in the range of 0.05 to 5 µm.

6. The fiber cement board of claim 1 wherein the nanocrystalline cellulose particles have a length in the range of 2.5 to 60 µm.

7. The fiber cement board of claim 1 wherein the MOE of the composite building material is 10% greater than a composite building material that does not have nanocrystalline cellulose.

8. The fiber cement board of claim 7 wherein the MOR of the composite building material remains substantially the same as a composite building material that does not contain nanocrystalline cellulose.

9. The fiber cement board of claim 7 wherein the ETB of the composite building material remains substantially the same as a composite building material that does not contain nanocrystalline cellulose.

10. The fiber cement board of claim 1 wherein the saturated moisture absorption is reduced 1% as compared to a composite building material that does not contain nanocrystalline cellulose.

11. The fiber cement board of claim 1 wherein the saturated moisture absorption is reduced 2% as compared to a composite building material that does not contain nanocrystalline cellulose.

12. The fiber cement board of claim 1 wherein the time it takes to reach 1 mm of vertical wicking is five times as long as in a composite building material that does not contain nanocrystalline cellulose.

13. The fiber cement board of claim 1 wherein the time it takes to reach 1 mm of vertical wicking is fifteen times as long as in a composite building material that does not contain nanocrystalline cellulose.

* * * * *